(12) United States Patent
Stemmler et al.

(10) Patent No.: US 9,573,475 B2
(45) Date of Patent: Feb. 21, 2017

(54) DRIVE UNIT FOR DRIVING A MOTOR

(71) Applicant: ABB Schweiz AG, Baden (CH)

(72) Inventors: Christoph Stemmler, Baden (CH); Thomas von Hoff, Niederrohrdorf (CH); Urs Ehrler, Gebensdorf (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/943,610

(22) Filed: Nov. 17, 2015

(65) Prior Publication Data

US 2016/0068068 A1 Mar. 10, 2016

Related U.S. Application Data

(63) Continuation of application No. PCT/EP2014/060056, filed on May 16, 2014.

(30) Foreign Application Priority Data

May 17, 2013 (DE) .......................... 10 2013 008 420

(51) Int. Cl.
*B60L 1/00* (2006.01)
*B60L 3/00* (2006.01)
(Continued)

(52) U.S. Cl.
CPC .............. *B60L 11/12* (2013.01); *B60K 6/26* (2013.01); *B60L 3/0046* (2013.01); *B60L 11/123* (2013.01); *B60L 11/1814* (2013.01); *F02N 11/04* (2013.01); *F02N 11/0859* (2013.01); *F02N 11/0862* (2013.01); *B60L 2200/26* (2013.01); *B60L 2200/40* (2013.01); *B60L 2260/26* (2013.01); *F02N 2011/0885* (2013.01); *F02N 2011/0896* (2013.01);
(Continued)

(58) Field of Classification Search
CPC ..... F02N 2011/0885; F02N 2011/0896; F02N 11/0862; F02N 11/0859; F02N 11/04; B60K 6/26; Y10S 903/906; Y02T 10/7077; Y02T 10/7005; B60L 2200/26; B60L 2200/40; B60L 2260/26; B60L 3/0046; B60L 11/1814; B60L 11/12; B60L 11/123
See application file for complete search history.

(56) References Cited

U.S. PATENT DOCUMENTS 6,486,568 B1 11/2002 King et al.
2005/0279242 A1 12/2005 Maier et al.
(Continued)

FOREIGN PATENT DOCUMENTS

EP 1201485 B1 5/2005
EP 2256013 A2 12/2010
(Continued)

OTHER PUBLICATIONS

International Preliminary Report on Patentability Application No. PCT/EP2014/060056 Issued: Nov. 19, 2015 7 pages.
(Continued)

*Primary Examiner* — Jared Fureman
*Assistant Examiner* — Esayas Yeshaw
(74) *Attorney, Agent, or Firm* — Whitmyer IP Group LLC

(57) ABSTRACT

A drive unit for driving and starting a motor in the form of an internal combustion engine designed for driving a traction generator coupled to the motor.

16 Claims, 7 Drawing Sheets

(51) Int. Cl.
*H02G 3/00* (2006.01)
*B60L 11/12* (2006.01)
*F02N 11/04* (2006.01)
*B60K 6/26* (2007.10)
*B60L 11/18* (2006.01)
*F02N 11/08* (2006.01)

(52) U.S. Cl.
CPC ........ *Y02T 10/6217* (2013.01); *Y02T 10/7077* (2013.01); *Y10S 903/906* (2013.01)

(56) References Cited

U.S. PATENT DOCUMENTS

| | | | |
|---|---|---|---|
| 2007/0124037 A1 | 5/2007 | Moran | |
| 2010/0096918 A1* | 4/2010 | Sawada | B60L 11/123 307/9.1 |
| 2012/0000739 A1* | 1/2012 | Nogi | B60M 3/04 191/50 |
| 2012/0007552 A1* | 1/2012 | Song | B60L 7/14 320/109 |
| 2012/0167114 A1 | 6/2012 | Morishita | |
| 2013/0038333 A1* | 2/2013 | Harada | G01R 31/3679 324/431 |
| 2013/0090797 A1* | 4/2013 | Izumi | B60L 11/123 701/22 |
| 2013/0096760 A1* | 4/2013 | Izumi | B60L 3/0046 701/22 |

FOREIGN PATENT DOCUMENTS

| | | |
|---|---|---|
| EP | 2399769 A2 | 12/2011 |
| WO | 2012091831 A1 | 7/2012 |

OTHER PUBLICATIONS

German Search Report Application No. 102013008420.2 Mailed: Aug. 22, 2013; Received: Aug. 26, 2013 5 pages.
International Report on Patentability Application No. PCT/EP2014/060056 Mailed: Aug. 19, 2015; Received: Aug. 21, 2015 6 pages.
International Search Report and Written Opinion Application No. PCT/EP2014/060056 Completed: Feb. 17, 2015; Mailing Date: Feb. 25, 2015 11 pages.
International Search Report (Translation) Application No. PCT/EP2014/060056 Mailing date: Feb. 24, 2015 8 pages.

* cited by examiner

DRIVE UNIT FOR DRIVING A MOTOR

FIELD OF THE INVENTION

The invention relates to a drive unit for driving a machine. In particular, the present invention relates to an improved driving for starting a motor in the form of an internal combustion engine designed for driving a traction generator coupled to the motor.

BACKGROUND OF THE INVENTION

It is known from the prior art that the starting of a powerful motor in the form of an internal combustion engine such as a diesel engine, for instance, which is used for driving a machine, such as, for example, in traction applications for trains or agricultural machines, is often realized using an additional, but in return significantly smaller, that is to say less powerful, auxiliary motor, which obtains its starting energy via an additional battery connected to the auxiliary motor, a so-called starter battery. Such an arrangement is found in motor vehicles, for example. In that case a starter battery embodied as an accumulator supplies the electric current for the starter of the motor in the form of the internal combustion engine of the motor vehicle. Besides the task of providing a specific energy potential or voltage level for starting the motor, however, the starter battery is often supplementarily used to support the supply of the on-board electrical network and diverse loads—connected thereto—of the vehicle.

A similar method for starting a motor is described in WO 2012/091831. In that case, a motor is connected to an alternator and an additional auxiliary motor. The alternator generates the necessary traction energy for the drive of the vehicle. The additional auxiliary motor is fed by a battery in order to provide the required torque for launching and starting the motor.

The methods known from the prior art for starting a motor, with a starter battery, have various disadvantages, however. Often the energy potential provided by the battery is insufficient during the process of starting the motor if the battery is designed for example only to provide a relatively low supply voltage of 24 volts. In such a case, an additional component part such as a step-up converter, for example, has to ensure that the energy potential provided by the battery is raised to a higher energy potential Moreover, the relatively low voltage provided by the battery brings about high battery currents during the process of starting the motor.

A further disadvantage concerning the use of a starter battery consists in the temperature-dependent performance thereof. However, this disadvantage is generally shared by all batteries. The performance of a battery decreases all the more here, the lower the ambient temperature to which the battery is exposed.

SUMMARY OF THE INVENTION

The technical objective problem addressed by the present invention consists in providing an improved and simpler drive unit for driving and for starting a motor which avoids or at least minimizes the abovementioned disadvantages from the prior art. In particular, the problem addressed by the present invention is that of providing an improved drive unit which enables the reliable starting of a motor and in this case necessitates only a minimal circuitry adaptation to the existing motor and drive unit of a vehicle. A further problem addressed by the present invention consists in making the process of starting a motor independent of a present energy potential of a battery, the so-called vehicle battery, which normally supports the starting of the motor and to reduce the loading on the vehicle's on-board electrical network attached to the vehicle battery.

The problem addressed by the present invention is solved by the features of the independent claim. Advantageous embodiments of the Invention are found in the accompanying dependent claims.

In particular, the problem is solved by a drive unit, comprising a power converter, which is connectable to a working machine, comprising an intermediate circuit, which is coupleable firstly to a first inverter and secondly to a second inverter, wherein the first inverter is designed to be connectable to a motor on the AC voltage side and is connected to the intermediate circuit on the DC voltage side and wherein the second inverter is connected to the intermediate circuit on the DC voltage side and is connectable to the working machine on the output side, and wherein the second inverter is designed to drive the working machine in such a way that the working machine is operable either as a motor or as a generator, Furthermore, the drive unit comprises a link to at least one energy storage and a switching unit connected to the power converter wherein the switching unit is operable in a first operating mode or second operating mode, wherein in the first operating mode the switching unit is designed to couple the power converter to the at least one energy storage in order to enable an energy flow from the at least one energy store via the switching unit to the intermediate circuit of the power converter and wherein in the second operating mode the switching unit is designed to disconnect the power converter from the at least one energy storage. Furthermore, the drive unit comprises an energy storage charging unit, which is connectable to the power converter to provide energy to the energy storage, One essential point of the present invention is that the starting of a motor, preferably of an internal combustion engine such as a diesel engine, for instance, which is used for example in traction applications for rail vehicles, such as rail motor units and locomotives, but also in fields of use closely related to traction, such as bus vehicles, for instance, which can additionally be equipped with a hybrid drive, is carried out by means of a working machine which is already present and which is coupleable to the motor. In this case, the working machine is operable either as a motor or a generator. In order to start the motor, the working machine is driven in motor operation, said working machine providing the starting torque required for starting the diesel engine. On account of the dual operating mode of the working machine, advantageously it is possible to omit an additional auxiliary motor which, in similar applications known from the prior art, would be used to provide the necessary starting torque for the motor in the form of an internal combustion engine.

The working machine can be started up with the aid of an energy storage that provides a required energy potential. The energy storage is coupled via a switching unit to the intermediate circuit of a power converter unit that supplies the working machine with energy. In this case, the switching unit can comprise mechanical and/or electrical switching means. The power converter unit comprises a first inverter and a second inverter, wherein the first and second inverters are electrically coupled to one other via an intermediate circuit. The intermediate circuit can preferably be embodied as a DC voltage intermediate circuit having a capacitive element. In this case, the drive unit according to the invention can be designed for processing intermediate circuit voltages in the low-voltage range and medium-voltage range with voltage characteristic values of more than 1000 volts. The first inverter is preferably embodied as a power converter and is connectable to a motor on the AC voltage side, which motor can preferably constitute an electric motor that can be driven. The second inverter of the power converter unit is coupled to the working machine on the output side.

The switching unit can be operated in such a way that the energy storage is connected to the power converter unit or disconnected therefrom. The switching unit can advantageously be embodied as an auxiliary converter that performs the switching to the respective operating mode. The switching can therefore be carried out by an auxiliary converter which, under certain circumstances, is already present. This has the advantage that the number of component parts required for switching is reduced to a minimum, which can result in a saving of costs and weight for the drive unit. Moreover, such a switching arrangement makes it possible to use smaller, lower-power and thus less expensive switch components since the required charging currents from the energy storage can be dimensioned to be very much smaller compared with a direct start without an energy storage.

The switching unit can additionally be operated in such a way that in travelling operation the energy storage is decoupled from the power converter unit in order to supply instead, for example, other loads connected to the switching unit with energy. That is to say that an energy flow can take place from the power converter unit via the switching unit to the loads connected to the switching unit, such as an on-board electrical network, for instance.

A further aspect of the present invention is that the energy storage need not be an integral part of the drive unit. The drive unit can also merely have interfaces for coupling one or a plurality of energy storages which are situated outside the drive unit.

The energy storage which can be embodied in the form of a battery, for example a lead-acid accumulator, makes available the energy potential required for starting up the working machine in the form of a defined nominal voltage. The latter can be 24 volts, 36 volts or 110 volts, for example. The energy storage is switched by the switching unit in such a way that an energy flow takes place from the energy storage via the switching unit to the power converter unit and the input side of the second inverter. If the nominal voltage provided by the energy storage does not suffice for the starting process, however, then under certain circumstances a step-up converter has to be additionally connected to the energy storage in order to provide the required energy potential for starting the working machine.

In a first preferred embodiment of the present invention, the drive unit comprises an energy charging unit, which is connectable to the power converter to provide energy to the energy storage in this way. For this purpose, the energy storage is coupled to an energy charging unit, thereby enabling an energy flow from the first inverter of the power converter unit to the energy charging unit. However, the use of a so-called reversible energy charging unit would also be conceivable. The latter would then have the function of feeding energy via the energy storage into the power converter unit or the power converter.

During the operation of the drive unit, that is to say for example during the travel of the vehicle which is operated, the energy charging unit ensures that the energy storage is charged. This advantageously makes it possible to ensure that the required energy is always available for the process of starting the diesel engine in order that the working machine coupled to the power converter unit can be operated, which in turn provides the required starting torque for the diesel engine connected to it.

In a further preferred embodiment, the switching unit is designed to couple the power converter to a supply network terminal in order to enable an energy flow from the intermediate circuit of the power converter via the switching unit toward the supply network terminal. The switching unit is preferably embodied as an auxiliary converter having a corresponding switch. For this purpose, it is necessary only to make minimal adaptations to the already existing hardware, such as, for instance, on an auxiliary converter which, under certain circumstances, is already present.

The respective switching by the switching unit therefore determines the direction of the energy flows passing toward the power converter unit or away from the power converter unit. That is to say that the position of the switch defines whether an energy flow takes place from the power converter unit via the switching unit to the supply network terminal or whether an energy flow takes place from an energy storage via the switching unit to the power converter unit. The fact that the switching can be carried out at an auxiliary converter affords the advantage that lower-power and thus smaller changeover switches can be used, which reduce the costs and the space requirement.

In a further preferred embodiment of the invention, the drive unit comprises an auxiliary energy storage, which is connectable to the intermediate circuit of the power converter. The auxiliary energy storage can be embodied as a supercap, for example, which can provide a larger energy potential in the form of a power potential than the energy storage. The drive unit can furthermore also comprise an interface-like link to an auxiliary energy storage, such that the auxiliary energy storage can be positioned at a different location than the drive unit. The use of an auxiliary energy storage makes it possible to provide, for the starting of the diesel engine, an energy potential that is independent of the provided energy potential of the energy storage. This is advantageous if the performance of the energy storage is dependent on temperature fluctuations. This is the case for batteries, in particular. It is known from the prior art that the performance of batteries such as lead-acid accumulators, for instance, and thus the provision of a constant energy potential is impaired if they are exposed to low ambient temperatures.

In one preferred embodiment of the invention, the auxiliary energy storage is charged via the energy storage. For this purpose, the auxiliary energy storage is connected to the intermediate circuit of the power converter unit via a converter unit. An impermissible loading of an on-board energy network for providing energy in a vehicle in which the drive unit is used is avoided in this way. In this case, the converter unit can be embodied as an IGBT converter which additionally has a braking resistor. The braking resistor additionally makes it possible to dissipate excess braking energy.

In particular, the converter unit is coupled to the DC voltage-side input of the second inverter of the power converter unit. Since the energy storage is coupled to the power converter via the switching unit, the auxiliary energy storage is charged thereby if an energy flow flows from the energy storage via the switching unit to the power converter unit and from there via the converter unit to the auxiliary energy storage. The switching unit has to be correspondingly switched for this purpose to enable such an energy flow. Such charging of the auxiliary energy storage is expedient particularly during travelling operation of the vehicle.

It should be noted that the excess braking energy can also be fed directly into the auxiliary energy storage.

The converter unit is additionally designed to raise a first energy potential stored in the auxiliary energy storage to a second energy potential which is providable for the intermediate circuit of the power converter if the process of starting the diesel engine is intended to be initiated. In such a case, the converter unit has a step-up converter that increases the voltage potential available from the auxiliary energy storage.

The auxiliary energy storage is additionally designed to be operable in charging or discharging operation. In the charging mode the auxiliary energy storage is charged by the energy storage. This is generally carried out before the process of starting the internal combustion engine. For this purpose, the switching unit is operated in the first operating mode, in which the energy storage is coupled to the intermediate circuit of the power converter via the switching unit. Energy is then fed from the energy storage via the switching unit into the intermediate circuit. Said energy is then conducted from the intermediate circuit via the converter unit into the auxiliary energy storage. The charging of the auxiliary energy storage with energy from the energy storage can for example also take place during the traveling of the vehicle.

If the auxiliary energy storage is operated in the discharging mode, then the auxiliary energy storage is coupled to the intermediate circuit of the power converter via the converter unit. Energy from the auxiliary energy storage is then provided to the intermediate circuit of the power converter. The energy flow from the auxiliary energy storage into the power converter unit makes it possible to provide an energy potential for starting the diesel engine that is independent of the energy potential of the energy storage. Energy potential here is taken to mean the available voltage potential of the energy storage. In this way, therefore, it is possible to reduce the loading on the on-board network of a vehicle, which would otherwise be fed principally via a vehicle battery. Moreover, the influence of the temperature dependence of a starter battery for starting an internal combustion engine can be minimized as a result.

In a further preferred embodiment of the present invention, the switching unit has a load protection element. In this case, said load protection element can be embodied as a diode in order to protect the energy storage against electrical overload.

In one preferred embodiment of the present invention, the drive unit comprises a control unit. The control unit is designed to control a coupling between the power converter unit, the switch unit, the energy storage, the auxiliary energy storage and the supply network terminal depending on an operating mode of the drive unit. In particular, the control unit can be operated in such a way that it supplies the switching unit with corresponding control commands in order, for example, to switch between a charging and discharging mode for the auxiliary energy storage.

BRIEF DESCRIPTION OF THE DRAWINGS

Embodiments of the invention are explained in detail below with reference to the drawing, in which, schematically.

DETAILED DESCRIPTION OF THE INVENTION

Figure 1:
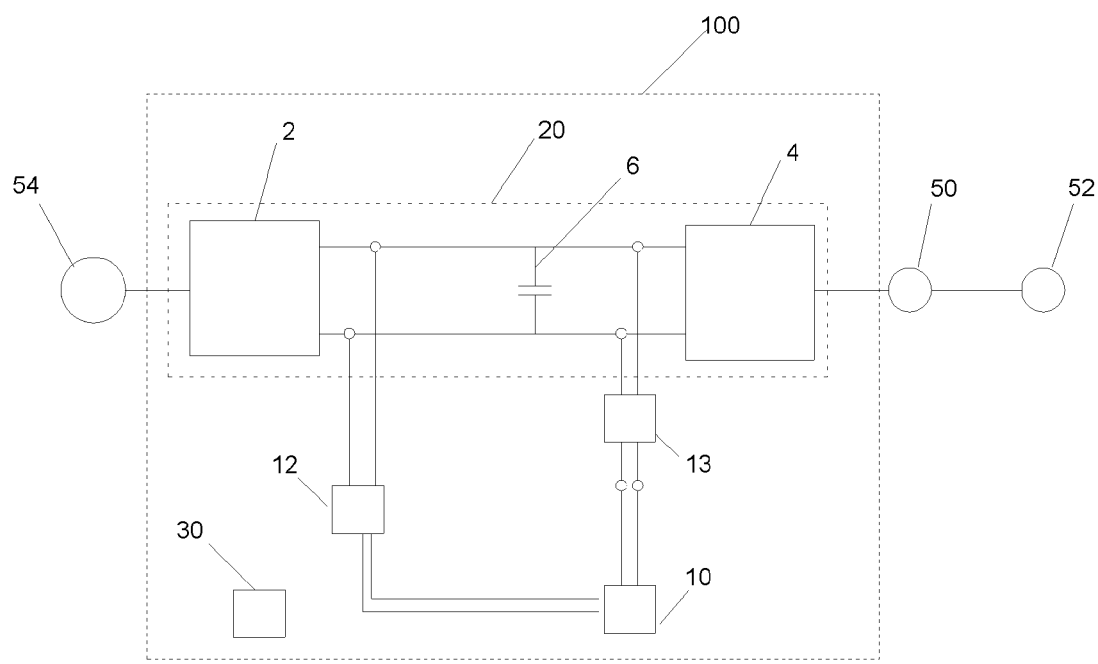
FIG. 1 shows a first embodiment of the drive unit according to the invention.

The reference symbols used in the drawing and their meanings are listed in summary in the List of Reference Symbols. In principle, identical parts are provided with identical reference symbols in the figure. The embodiment described represents the subject matter of the invention by way of example and has no limiting effect.

FIG. 1 shows a first embodiment of the drive unit 100 according to the invention. In this exemplary embodiment, the drive unit 100 consists of a power converter unit 20, a control unit 30, an energy storage 10, an energy storage charging unit 12 and a switching unit 13. The power converter unit 20 is composed of a first inverter 2 and a second inverter 4, wherein the first inverter 2 is electrically connected to the first inverter 4 via an intermediate circuit 6. The intermediate circuit 6 is preferably embodied as a DC voltage intermediate circuit having a capacitive element. Depending on the field of use of the drive unit 100 according to the invention, the invention can be used for example as a generator in the low-voltage range and/or else in the medium-voltage range with voltage values above 1000 volts. The first inverter 2 is connected to a motor 54 on the AC voltage side and to the intermediate circuit 6 on the DC voltage side. The motor 54 can be embodied as an electric motor, for example. The electric motor can be used to drive a traction unit, for example, such as, for instance, traction axles of a train such as a rail motor unit or a locomotive, for example.

However, the present invention is not restricted to use in traction applications. A further technical field for the present invention would be, for example, use in vehicles such a hybrid buses. The second inverter 4 is connected to the intermediate circuit 6 on the DC voltage side and is preferably connected to a working machine 50 on the output side, that is to say on the AC voltage side. In this case, the working machine can be embodied as an asynchronous machine, a synchronous machine or else as an electric motor. The working machine can additionally be regulated, to be precise with a sensor, but also preferably without the use of a sensor for rotational speed regulation. The working machine 50 is coupled to a motor 52, preferably an internal combustion engine such as a diesel engine, for example. The working machine 50 can be operated as a motor or a generator. In generator operation, the working machine 50 and motor 52 in the form of an internal combustion engine provide the necessary energy for driving a vehicle on which the drive unit 100 is installed. In order to start the motor 52, the working machine 50 is operated as a motor that supplies the starting torque required for starting the motor 52.

The motor 52 is therefore started with the aid of the working machine 50, which likewise requires a specific energy potential or a voltage potential for starting up. This energy potential is provided by an energy storage 10 coupled to the power converter 20 via a switching unit 13. The energy storage 10 is coupled to an energy storage charging unit 12, which provides for the charging of the energy storage 10. The charging of the energy storage 10 can preferably be carried out during traveling operation of the vehicle that is driven by the drive unit 100. The energy storage charging unit 12 is coupled to the DC voltage-side output of the first inverter 2 of the power converter 20, such that an energy flow can flow from the power converter 20 via the energy storage charging unit 12 to the energy storage 10.

In this case, the energy storage 10 can preferably be embodied as a battery. The battery can preferably provide voltages of 24 volts, 36 volts or approximately 110 volts, which is dependent on the respective application and operating mode of the drive unit 100. However, the energy storage can likewise be embodied as a separate starter battery, as a vehicle battery present in a vehicle, as a supercap with capacitor. In addition, in one particular embodiment, the energy storage 10 could be supplied with energy by means of so-called depot feeding. Depot feeding should be understood to mean feeding of energy in which the energy source is provided by an energy network present and installed outside the vehicle that is operated with the drive unit 100.

The switching unit 13 is responsible, as required, for coupling the energy storage 10 to or from the power converter 20. In this regard, it is not necessary, for example, to leave the energy storage 10 coupled to the power converter 20 during traveling operation. The charging of the energy storage 10 by means of the energy charging unit 12 is carried out if the energy storage 10 is not electrically connected to the switching unit 13. Although the energy storage 10 is part of the drive unit 100 in the embodiment illustrated, this need not necessarily be the case. The energy storage 10 can also be installed outside the drive unit 100, provided that the drive unit 100 provides the corresponding connecting interfaces. The switching unit 13 brings about targeted connection to and disconnection from the energy storage 10, but also from other loads or terminals, such as a supply network terminal, for instance, depending on the respective operating mode of the drive unit 100.

In this case, the switching unit can be embodied as an auxiliary converter that brings about the switching. The changeover switch can be dimensioned with correspondingly low power on account of the comparatively low charging currents, which saves costs and space for the incorporation of the converter into the drive unit 100 if the motor 52 were instead started exclusively via a starter battery.

The control unit 30 brings about, depending on the operating mode of the drive unit 100, a coupling between the in dependence on an operating mode of the drive unit 100, a coupling between the power converter 20, the switch unit 13, the energy storage 10, the energy storage charging unit 12 and loads connected to the switching unit 13, such as, for example, a supply network terminal (not illustrated). In general, therefore, the control unit 30 will act on the switching unit 13 in order to couple the components of the drive unit 10 to one another depending on the desired operating mode.

With regard to the charging unit 12 it should be noted that the latter can also be embodied as a reversible charging unit. Such a charging unit would make it possible that energy can also flow from the energy storage 10 into the power converter 20. Such an application would preferably be practicable if, for example, no switching unit 8, 13 were present in the drive unit 100.

Figure 2:
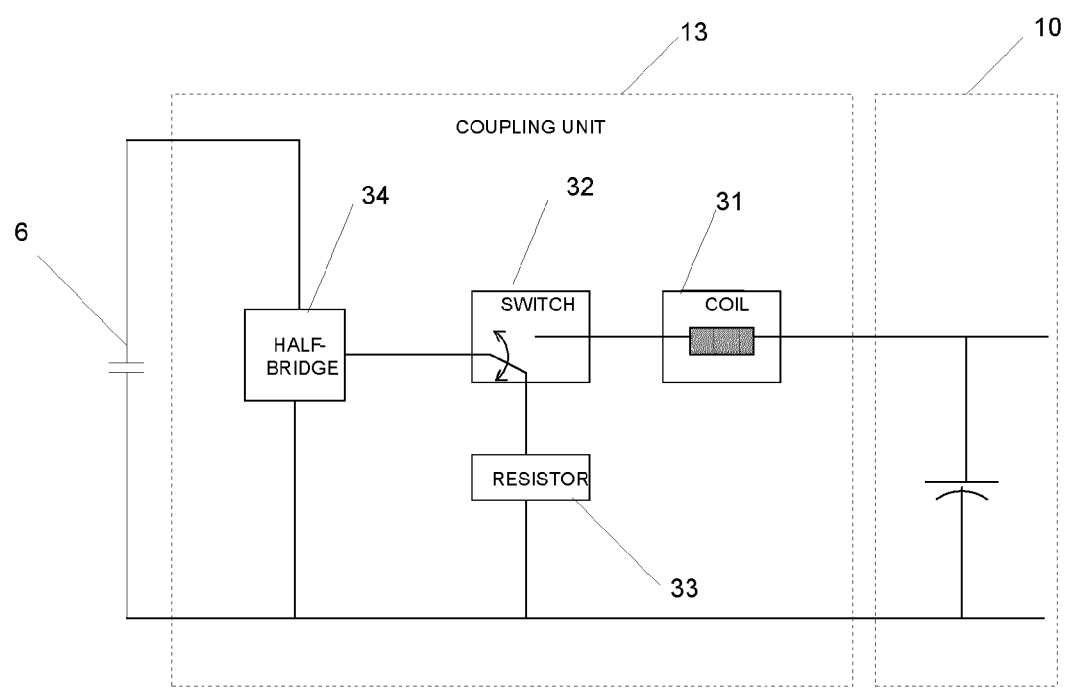
FIG. 2 shows a first embodiment of the switching unit.

FIG. 2 shows a first detailed embodiment of the switching unit 13. The switching unit 13 is coupled to the energy storage 10, which provides a defined energy potential for starting the motor 52, and the intermediate circuit 6 of the power converter 20 (not illustrated). In the embodiment shown, the switching unit 13 has a coil 31, a switch 32, and the device for the electrical brake that is normally always present in the converter unit 20, the braking resistor 33, and a voltage adapter 34. The switch 32 couples either in the first case the energy storage 10 and the coil 31 or in the second case the resistor 33 with the voltage adapter 34 to the intermediate circuit 6. It should be noted that the switch 32 can also be correspondingly influenced in its operating behavior by externally fed control signals of a control unit (not illustrated). In the first case, the coupling of the coil 31 to the energy storage 10 has the effect that the energy potential supplied by the energy storage 10 is raised by a specific value to a higher energy potential. The switching unit 13 operates as a step-up converter in this first case. This is necessary whenever the available energy potential of the energy storage 10 is insufficient for allowing the working machine 50 to start up. The coil 31 additionally also has a filter function for the energy storage 10 in order to minimize current ripple which, under certain circumstances would damage the energy storage 10. The voltage adapter 34 can be regarded as a DC/DC converter that can be realized as a half-bridge, for example. In the second case, in which the switch 32 connects the resistor 33 to the voltage adapter 34, the resistor 33 acts as a so-called braking resistor. This switching configuration is preferably used in braking operation. If the vehicle is braked, then excess braking energy is dissipated in the braking resistor 33.

In the configuration shown in FIG. 2, therefore, the switching unit 13 can have the function of a DC-DC converter that transfers the voltage provided by the energy storage 10 to a higher level. Particularly in traction applications, an already existing hardware configuration, such as an electrical braking circuit, can be correspondingly modified by few adaptations in order to obtain the described function in a simple manner.

Figure 3:
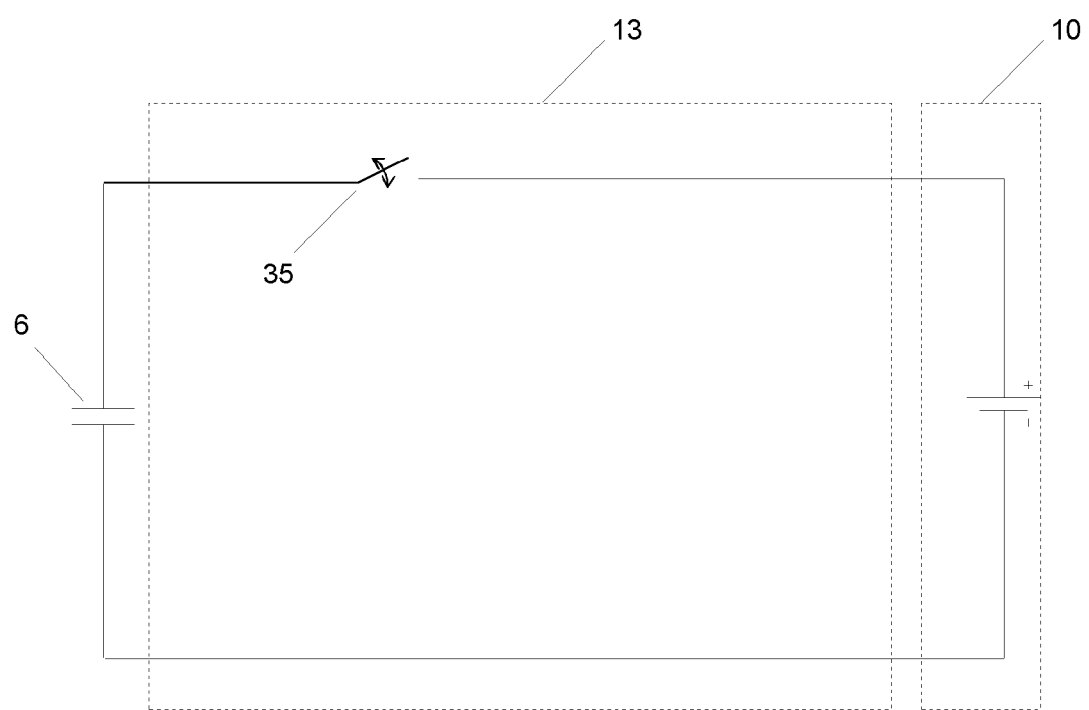
FIG. 3 shows a second embodiment of the switching unit.

FIG. 3 shows a second alternative embodiment of the switching unit 13 as to how the energy storage 10 can he coupled to the intermediate circuit 6 of the power converter 20 for the process of starting the motor 52 in accordance with FIG. 1 in order that an energy flow can flow from the energy storage 10 via the switching unit 13 to the intermediate circuit 6 of the power converter 20. In this circuit variant, a mechanical or electrical switch 35 ensures that the energy storage 10 is coupled to the intermediate circuit 6 of the power converter 20. This very simple and therefore very cost-effective configuration is preferably used if the energy storage 10 is already dimensioned in such a way that it can supply a sufficient voltage which need not first be transferred to a higher energy level before the energy is transferred into the intermediate circuit 6 of the power converter 20.

Figure 4:
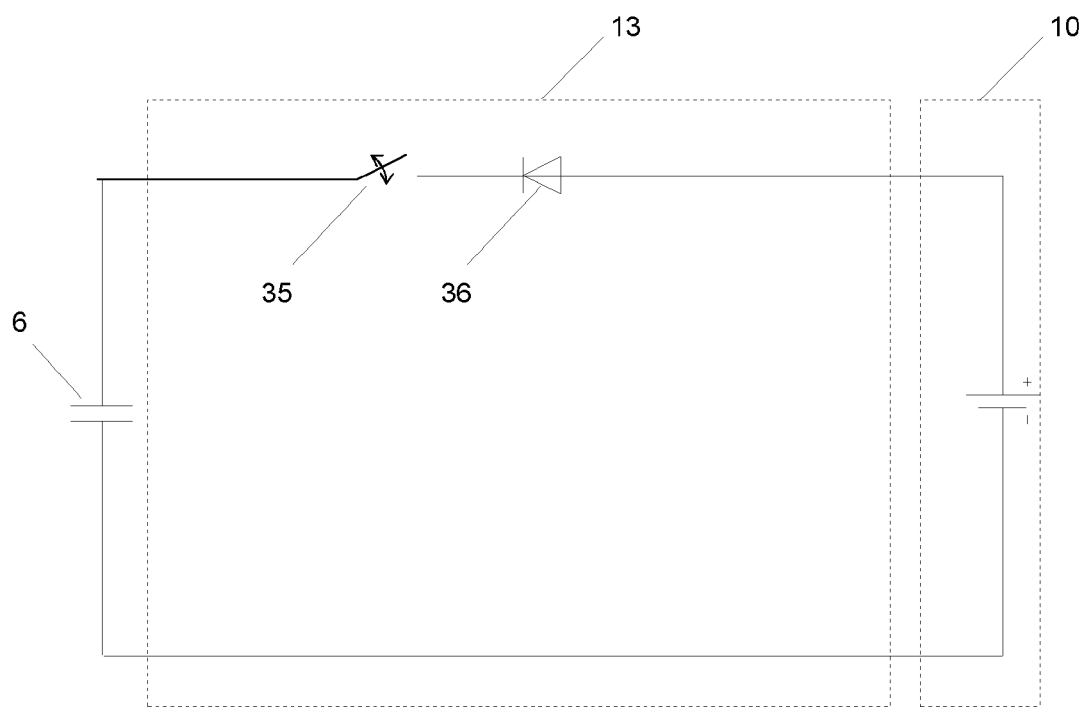
FIG. 4 shows a third embodiment of the switching unit.

FIG. 4 differs with the alternative embodiment of the switching unit 13 shown in FIG. 3 merely in that a load protection element 36 as dynamic control element is integrated into the electrical circuit between the energy storage 10 and the switch 35. In this case, the load protection element 36 can preferably be embodied as a reverse-bias diode. The latter is intended to protect the energy storage 10 against overload.

Figure 5:
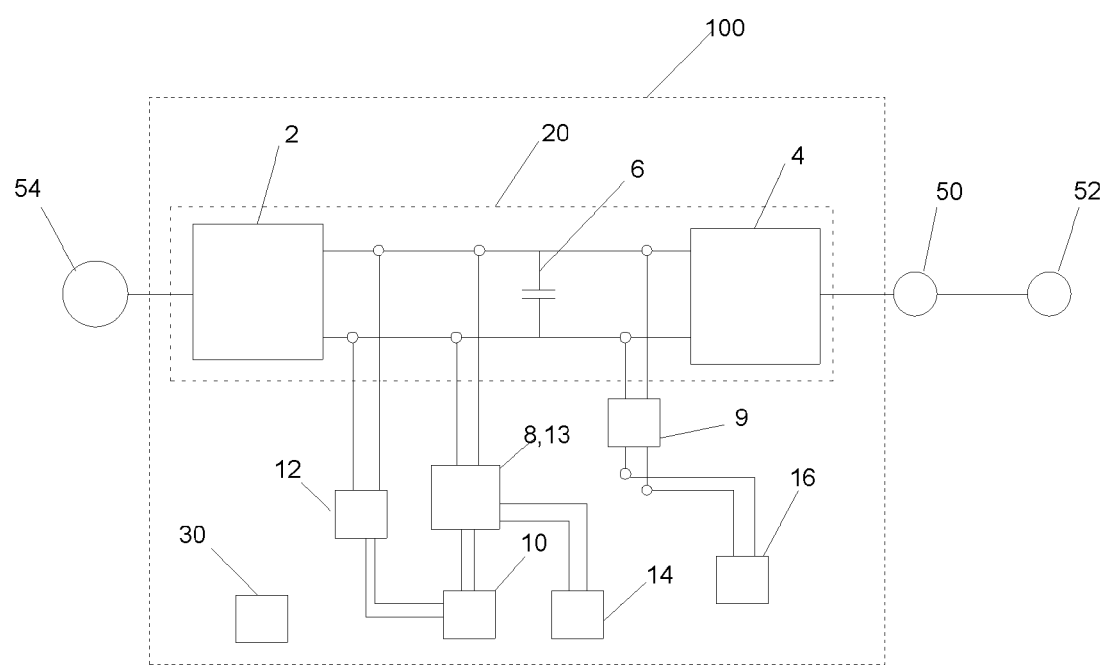
FIG. 5 shows a second embodiment of the drive unit according to the invention.

FIG. 5 shows a second and alternative embodiment of the drive unit 100 according to the invention. The embodiment shown differs from FIG. 1 firstly in that the switching unit 13 is connected to the DC voltage-side output of the first inverter 2. In addition, a terminal for loads such as, for instance, a supply network 14 of 400 V is coupleable to the switching unit 13. Moreover, the drive unit 100 now has a converter unit 9 coupled to the intermediate circuit 6 of the power converter 20. An auxiliary energy storage 16, which can be embodied as a supercap, for example, is connected to the converter unit 9. A supercap can be an energy storage such as a capacitor, for instance. In this case, the auxiliary energy storage 16 can provide, inter alfa, for reducing the loading on the on-board electrical network of a vehicle since the loading on a vehicle battery already present is thus reduced if the vehicle battery does not have to provide on its own the required energy for starting the motor 52.

In this alternative circuit variant of the drive unit 100, the energy potential necessary for starting the motor 52 is provided by the auxiliary energy storage 16. The auxiliary energy storage 16 need not be part of the drive unit 100 and can also be fitted outside the drive unit 100.

In order that the auxiliary energy storage 16 is charged with energy, the switching unit 13 supplementarily connects the energy storage 10, which was charged by the energy storage charging unit 12 during travel, for example, to the power converter unit 20 and ensures that a power flow takes place from the energy storage 10 via the switching unit 13 to the intermediate circuit 6 of the power converter unit 20. From the intermediate circuit 6 of the power converter unit 20, the transferred power flow is finally conducted via the converter unit 9 to the auxiliary energy storage 16. Thus, in the charging mode, by means of the energy storage 10, a power flow to the auxiliary energy storage 16 is conducted via the switching unit 13. In normal operation of the drive unit, the switching unit 13 disconnects the energy storage 10 and instead couples a load 14 to the switching unit 13, such that a power flow can take place from the intermediate circuit 6 to the load 14. In this case, the load 14 can be embodied as a terminal connection to a voltage or electricity network. However, the load 14 can also be embodied as a terminal for a depot socket for depot feeding.

If the auxiliary energy storage 16 is charged, its energy can then be used for the process of starting the motor 52. For this purpose, the converter unit 9 is correspondingly connected—for example by the control unit 30, such that a power flow takes place from the auxiliary energy storage 16 via the converter unit 9 into the intermediate circuit 6. What is achieved in this way is that the process of starting the motor 52 is carried out by starting the working machine 50, operated as a motor, independently of the present energy potential or the present voltage potential of the energy storage 10. This can be an essential aspect particularly if the performance of the energy storage 10 is impaired, for example by low ambient temperatures to which the energy storage 10 is possibly exposed. A starting process carried out without an energy storage 10, only using the auxiliary energy storage 16, would also be conceivable.

The converter unit 9 can be embodied as an IGBT converter having a braking resistor, for example, which simultaneously takes up the braking energy generated.

The configuration shown in FIG. 5 also has the advantage that starting directly via a starter battery, which can preferably be embodied as a vehicle battery, is avoided for starting the motor 52. Large charging currents from the vehicle battery are avoided in this way and contribute to a relief of the on-board energy network of the vehicle. In the configuration illustrated in FIG. 1, the motor 52 is started via the working machine 50 connected between the power converter 20 and the motor 52.

Figure 6:
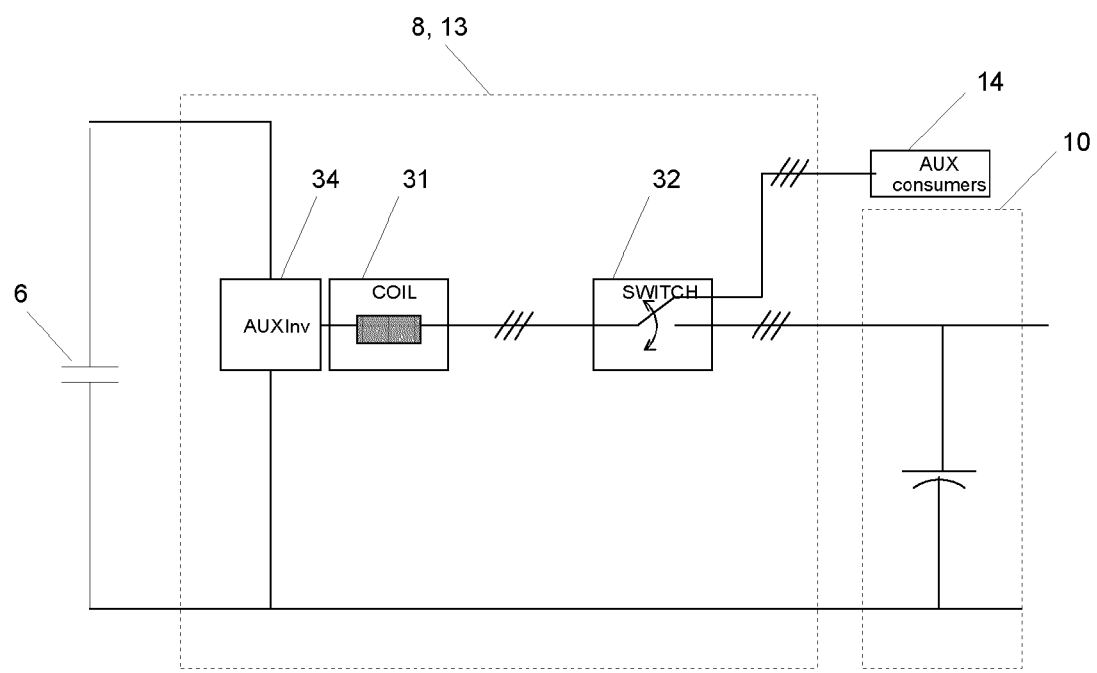
FIG. 6 shows a fourth embodiment of the switching unit.

FIG. 6 shows a fourth embodiment of the switching unit 13 such as can preferably be used in FIG. 5. The switching unit 13 has a switch 32, which couples either load 14 or the energy storage 10 to a coil 31 and a voltage adapter 34, which can also be embodied as a DC-DC converter. The latter ensures that when a low-power energy storage 10 is used, the energy potential provided by the energy storage 10 is increased before being passed to the intermediate circuit 6. The switching unit 13 therefore also has the function of a step-up converter. The switch 32 can preferably also be a three-pole switch.

The coil 31 as filter provides for damping the harmonics if a load 14 such as an auxiliary operation network, for example, is coupled to the voltage adapter 34. If the voltage adapter 34 is coupled to the energy storage 10, then the coil 31 in association with the voltage adapter 34 acts as a step-up converter.

With regard to the function of a step-up converter, it can be stated in summary for the present invention that said function can be provided by a supercap which can be precharged via an energy storage, such as a battery, which can be embodied as a starter or vehicle battery. However, it would be conceivable also to provide the function of a step-up converter via the intermediate circuit, which is precharged via a battery. Given corresponding dimensioning of the individual component parts, however, the present invention can also manage without the use of a step-up converter.

Figure 7:
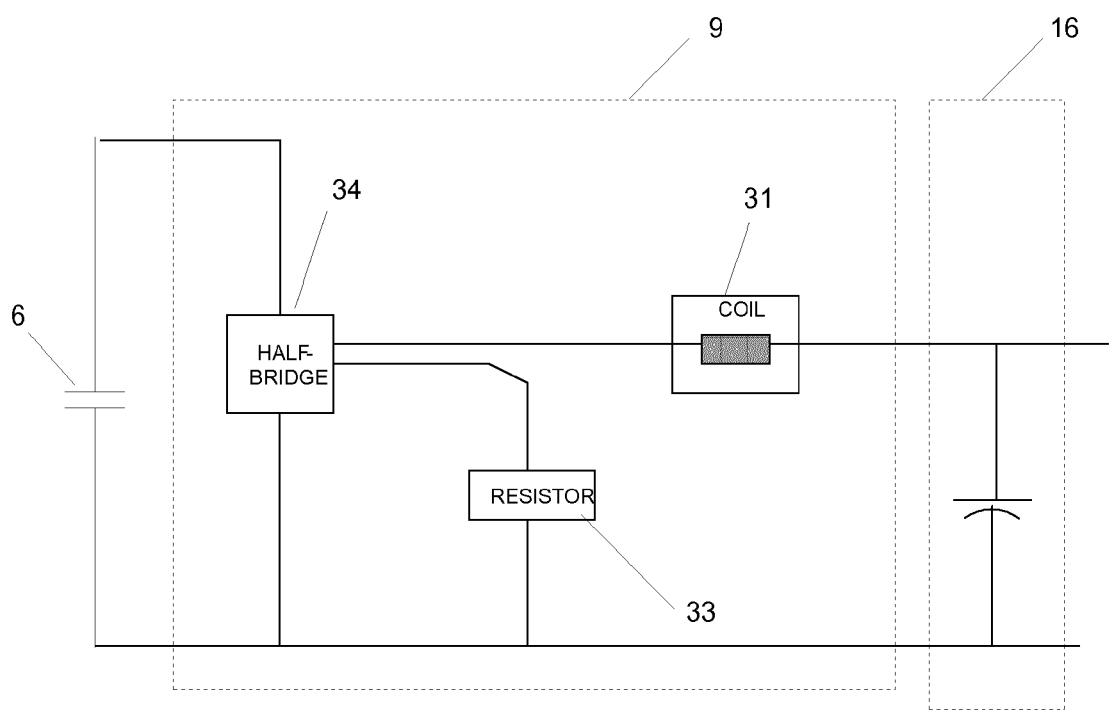
FIG. 7 shows a fifth embodiment of the switching unit.

FIG. 7 shows one embodiment of the converter unit 9 which, as shown in FIG. 5, is coupled to an auxiliary energy storage 16 and the intermediate circuit 6 of the power converter unit 20. The converter unit 9 has a coil 31, a resistor 33, which is used as a braking resistor, and a DC-DC converter 34, which can be realized as a half-bridge. The DC-DC converter 34 is coupled in terms of signal transfer firstly both to the coil 31 and to the resistor 33 and secondly to the intermediate circuit 6.

During the starting of the motor 52 (not illustrated), energy is transferred from the auxiliary energy storage 16 via the switching unit 13 into the intermediate circuit 6. If the vehicle brakes, then energy is conducted via the intermediate circuit 6 into the brake resistor 33 of the converter unit 9.

LIST OF REFERENCE SYMBOLS

2 Power converter
4 Inverter
6 Intermediate circuit
8, 13 Switching unit
9 Converter unit
10 Energy storage
12 Energy storage charging unit
13 Load protection element
14 Supply network terminal
16 Auxiliary energy storage
20 Power converter unit
30 Control unit
31 Coil
32 Switch
33 Resistor
34 DC-DC converter
35 Switch
36 Load protection element
50 Working machine
52 Motor (diesel engine)
54 Drive motor (for traction)
100 Drive unit

What is claimed is:
1. A drive unit comprising:
a power converter, which is connectable to a working machine, comprising an intermediate circuit, which is coupleable firstly to a first inverter and secondly to a second inverter, wherein the first inverter is designed to be connectable to a motor on an AC voltage side of the first inverter and is connected to the intermediate circuit on a DC voltage side of the first inverter, and wherein the second inverter is connected to the intermediate circuit on a DC voltage side of the second inverter and is connectable to the working machine on an AC voltage side of the second inverter, and wherein the second inverter is designed to drive the working machine in such a way that the working machine is operable either as a motor or as a generator;

a link to at least one energy storage;

a switching unit connected to the power converter, wherein the switching unit is operable in a first operating mode or second operating mode, wherein in the first operating mode the switching unit is designed to couple the power converter to the at least one energy storage in order to enable an energy flow from the at least one energy storage via the switching unit to the intermediate circuit of the power converter and wherein in the second operating mode the switching unit is designed to disconnect the power converter from the at least one energy storage;

wherein the drive unit comprises an energy storage charging unit, which is connectable to the power converter to provide energy to the energy storage, wherein the charging of the energy storage by the energy charging unit is carried out, if the switching unit is in its second operating mode, and wherein the switching unit is designed to couple the power converter to a supply network terminal in order to enable an energy flow from the intermediate circuit of the power converter via the switching unit toward the supply network terminal.

2. The drive unit as claimed in claim 1, characterized in that, the switching unit is in the second operating mode, if the energy storage is not electrically connected to the switching unit.

3. The drive unit as claimed in claim 1, characterized in that the drive unit comprises an auxiliary energy storage, which is connectable to the intermediate circuit of the power converter.

4. The drive unit as claimed in claim 3, characterized in that a converter unit is connected between the auxiliary energy storage and the intermediate circuit of the power converter.

5. The drive unit as claimed in claim 4, characterized in that the auxiliary energy storage is designed to be operable in charging or discharging operation, wherein in the charging mode the switching unit is operated in the first operating mode, in which the energy storage is coupled to the intermediate circuit of the power converter via the switching unit, such that energy from the energy storage is feedable into the intermediate circuit via the switching unit, said energy then being transferred from the intermediate circuit via the converter unit into the auxiliary energy storage, and, if the auxiliary energy storage is operated in the discharging mode, the auxiliary energy storage is coupled to the intermediate circuit of the power converter via the converter unit in order that energy from the auxiliary energy storage is provided to the intermediate circuit of the power converter.

6. The drive unit as claimed in claim 1, characterized in that the switching unit has a load protection element designed to protect the energy storage against electrical overload.

7. The drive unit as claimed in claim 5, characterized in that the load protection element is a diode.

8. The drive unit as claimed in claim 1, characterized in that the drive unit comprises a control unit, which is designed to control a coupling between the power converter, the switch unit, the energy storage, the auxiliary energy storage and the supply network terminal depending on an operating mode of the drive unit.

9. The drive unit as claimed in claim 1, characterized in that the auxiliary energy storage is embodied as a supercap.

10. The drive unit as claimed in claim 1, characterized in that the intermediate circuit of the power converter is embodied as a DC voltage intermediate circuit.

11. The drive unit as claimed in claim 1, characterized in that the switching unit comprises mechanical and/or electrical switching means.

12. The drive unit as claimed in claim 1, characterized in that the energy storage is a battery.

13. A vehicle comprising a drive unit including:

a power converter, which is connectable to a working machine, comprising an intermediate circuit, which is coupleable firstly to a first inverter and secondly to a second inverter, wherein the first inverter is designed to be connectable to a motor on an AC voltage side of the first inverter and is connected to the intermediate circuit on a DC voltage side of the first inverter, and wherein the second inverter is connected to the intermediate circuit on a DC voltage side of the second inverter and is connectable to the working machine on an AC voltage side of the second inverter, and wherein the second inverter is designed to drive the working machine in such a way that the working machine is operable either as a motor or as a generator;

a link to at least one energy storage;

a switching unit connected to the power converter, wherein the switching unit is operable in a first operating mode or second operating mode, wherein in the first operating mode the switching unit is designed to couple the power converter to the at least one energy storage in order to enable an energy flow from the at least one energy storage via the switching unit to the intermediate circuit of the power converter and wherein in the second operating mode the switching unit is designed to disconnect the power converter from the at least one energy storage;

wherein the drive unit comprises an energy storage charging unit, which is connectable to the power converter to provide energy to the energy storage, wherein the charging of the energy storage by the energy charging unit is carried out, if the switching unit is in its second operating mode, and wherein the switching unit is designed to couple the power converter to a supply network terminal in order to enable an energy flow from the intermediate circuit of the power converter via the switching unit toward the supply network terminal.

14. The vehicle as claimed in claim 13, characterized in that the vehicle is a rail vehicle.

15. The vehicle as claimed in claim 13, characterized in that the vehicle is provided with a hybrid drive.

16. A drive unit comprising:

a power converter having an intermediate circuit;

the intermediate circuit connected to a first inverter and a second inverter;

the first inverter connected to a motor;

the second inverter connected to a working machine having a first mode and a second mode;

in the first mode, the working machine is operated as a motor to supply a torque to start a second motor connected to the working machine;

in the second mode, the working machine is operated as a generator;

a switching unit connected to the power converter, the switching unit having a first operating mode and a second operating mode;

in the first operating mode, the switching unit couples the power converter to an energy storage to enable an energy flow from the energy storage through the switching unit and to the intermediate circuit of the power converter;

in the second operating mode, the switching unit connects a supply network terminal to the power converter to enable an energy flow from the intermediate circuit of the power converter, through the switching unit, to the supply network terminal, and the energy storage is connected to an energy storage charging unit.

* * * * *